United States Patent
Oomori (10) Patent No.: US 6,983,992 B2
(45) Date of Patent: Jan. 10, 2006

(54) BACKREST ASSEMBLY FOR MOTORCYCLE

(75) Inventor: Hiroyasu Oomori, Niiza (JP)

(73) Assignee: Honda Access Corp., Saitama (JP)

( * ) Notice: Subject to any disclaimer, the term of this patent is extended or adjusted under 35 U.S.C. 154(b) by 0 days.

(21) Appl. No.: 11/007,232

(22) Filed: Dec. 9, 2004

(65) Prior Publication Data

US 2005/0275268 A1    Dec. 15, 2005

(30) Foreign Application Priority Data

Jun. 14, 2004  (JP)  ............................. 2004-175978

(51) Int. Cl.
    *B60N 2/02*  (2006.01)
(52) U.S. Cl. ........................ 297/357; 297/376; 297/352
(58) Field of Classification Search ................ 297/357, 297/354.12, 354.1, 376, 374, 352; 280/288.4, 280/304.4, 727; 180/219
    See application file for complete search history.

(56) References Cited

U.S. PATENT DOCUMENTS

| | | | |
|---|---|---|---|
| 1,033,156 A * | 7/1912 | Conboy ....................... 297/209 |
| 3,822,917 A * | 7/1974 | George ................... 297/215.12 |
| 3,901,534 A * | 8/1975 | Popken .................... 280/304.4 |
| 4,032,189 A * | 6/1977 | Benavente et al. ......... 297/352 |
| 5,026,119 A * | 6/1991 | Frank et al. ................. 297/383 |
| 5,441,330 A * | 8/1995 | Rojas .......................... 297/383 |
| 5,667,232 A * | 9/1997 | Gogan et al. ............... 280/202 |
| 6,102,479 A * | 8/2000 | Wallace ....................... 297/357 |
| 6,224,081 B1 * | 5/2001 | Wayman et al. .......... 280/288.4 |
| 6,347,804 B1 * | 2/2002 | Seibel ...................... 280/288.4 |
| 6,659,547 B2 * | 12/2003 | Petersen ................... 297/215.1 |
| 2003/0025290 A1 * | 2/2003 | McCann ...................... 280/202 |
| 2004/0045990 A1 * | 3/2004 | Kan et al. .................... 224/413 |

FOREIGN PATENT DOCUMENTS

| | | |
|---|---|---|
| JP | 2-38872 | 10/1990 |
| JP | 11-139369 | 5/1999 |
| JP | 2003-182665 | 7/2003 |
| JP | 2004-98749 | 4/2004 |

* cited by examiner

*Primary Examiner*—Milton Nelson, Jr.
(74) *Attorney, Agent, or Firm*—Westerman, Hattori, Daniels & Adrian, LLP (57) ABSTRACT

A backrest of a motorcycle is provided with a pair of angle-adjusting units. In each angle-adjusting unit, a metal arm of the backrest is pivotally connected, by a connecting shaft, to an inner side of each of a seat stay mounted along a side of a seat. A retaining unit selectively and detachably retains a lower end of the metal arm at a plurality of retaining positions. The retaining unit is biased by a biasing member in a retaining direction.

12 Claims, 10 Drawing Sheets

BACKREST ASSEMBLY FOR MOTORCYCLE

BACKGROUND OF THE INVENTION

1. Field of the Invention

The present invention relates to a backrest assembly that allows the angle of a backrest provided behind a seat of a motorcycle to be adjusted to a desired angle.

2. Description of the Related Art

Japanese Examined Utility Model Registration Application Publication No. 2-38872 (FIGS. 1 to 3) discloses a backrest assembly that includes a frame standing behind a seat, and an arm having an upper end for supporting a back cushion and a lower end pivotally attached to the frame. The angle of the backrest can be adjusted by engaging a connecting rod provided above the pivot position of the arm with lock plates provided in the frame.

In the above backrest assembly, the arm can pivot forward relative to the frame in order to adjust the angle thereof, but the arm cannot pivot behind the frame, because the frame standing behind the seat is not pivotable. For this reason, the arm can be adjusted as the backrest for the front rider on a tandem seat, but the arm cannot be adjusted at all as the backrest for the rear rider. Moreover, since the frame must stand behind the seat in order to mount the lock plates thereon, a large-scale mounting operation to the body of the motorcycle is required. This increases the cost and deteriorates the appearance.

SUMMARY OF THE INVENTION

In view of the above problems, it is an object of the present invention to provide a backrest assembly that can reliably adjust the angle of a backrest and can be made compact at lower cost and can have a pleasing appearance on a motorcycle.

In order to achieve the above object, an aspect of the present invention relates to a backrest assembly for a motorcycle including a pivotable backrest provided behind a seat of the motorcycle, and a pair of angle-adjusting units that adjust the angle of the backrest to a desired angle. The backrest includes a back cushion and a pair of metal arms extending downward from two sides of the back cushion to support the back cushion. Each of the angle-adjusting units includes a connecting shaft for pivotally connecting one of the metal arms to an inner side of a seat stay provided along a side of the seat, a retaining unit for selectively and detachably retaining a lower end of the corresponding metal arm below the connecting shaft at a plurality of retaining positions, and a biasing member for biasing the retaining unit in a retaining direction.

According to the present invention, each of the metal arms is attached to a corresponding seat stay by a connecting shaft so that the backrest is pivotable. Moreover, since the lower ends of each metal arm extending below the connecting shafts are retained at a desired angular position by the retaining units, the angle of the backrest can be secured reliably. Since the retaining units are provided at the lower ends of the metal arms, the backrest assembly can be made compact, and the retaining units can be hidden inside the seat stays. Therefore, the retaining units can be provided without negatively affecting the appearance of the motorcycle. Furthermore, since the retaining units are biased in the retaining direction by the biasing members, retention of the lower ends of the metal arms by the retaining units is prevented from being released accidentally. In addition, the angle of the backrest can be easily adjusted merely by releasing the retention by the retaining units against the biasing forces of the biasing members.

Preferably, each retaining unit includes a base member having a plurality of recesses, and the base member is provided on one of the corresponding metal arm and the corresponding seat stay, and a claw provided in the other of the corresponding metal arm and the corresponding seat stay so as to be selectively retained in the recesses, and one of the claw and the base member is separable from the other and is biased in the retaining direction by the biasing member. In this case, the angle of the backrest can be easily adjusted merely by disengaging the claw from a recess against the biasing force of the biasing member and retaining the claw in another recess corresponding to a desired angle. Since the claw can be reliably held in the recess by the biasing member, the backrest can be prevented from undesirable pivotal motion. Moreover, since the claw and the base member that define the retaining unit are provided, respectively, on the metal arm and on the seat stay, it is unnecessary to further process the body of the motorcycle, and this reduces the cost.

Preferably, the backrest assembly further includes a pair of sliding members, each of the sliding members being slidable along the corresponding metal arm, the corresponding base member is provided on the corresponding seat stay with the recesses opposing the lower end of the metal arm, the claw extends from a lower end of the sliding member toward the recesses of the base member, and the biasing member biases the claw through the sliding member in a direction such as to retain the claw in the recesses. In this case, the metal arm and the sliding member can have an integrated appearance, and the angle-adjusting unit can be made extremely compact, because the claw is provided in the sliding member. That is, the angle-adjusting unit can be provided without negatively affecting the appearance of the motorcycle.

DESCRIPTION OF THE PREFERRED EMBODIMENTS

An embodiment of the present invention will be described below with reference to the attached drawings.

Figure 1:
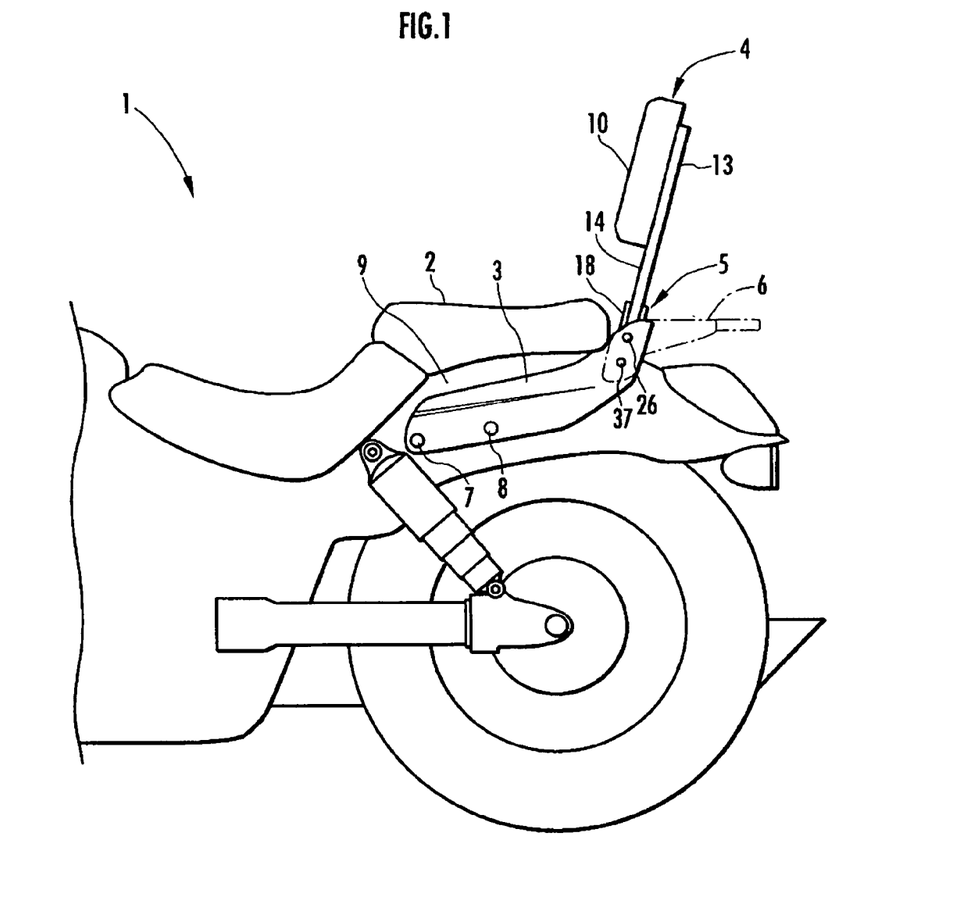
FIG. 1 is an explanatory view showing a mounting state of a backrest assembly according to an embodiment of the present invention.

FIG. 1 shows the rear half of a motorcycle 1. In the motorcycle 1, a pair of seat stays 3 are provided on both sides of a seat 2 (a rear part of a tandem seat in this embodiment). A backrest 4 and a pair of angle-adjusting units 5 for adjusting the angle of the backrest 4 to a desired angle are provided on the rear sides of the seat stays 3 to define the backrest assembly of the present invention.

A rear carrier 6 is connected to the rear sides of the seat stays 3, as necessary. The seat stays 3 are each made of a chromium-plated iron plate, and are symmetrically arranged and fixed to a seat frame 9 by a plurality of bolts 7 and 8.

Figure 7:
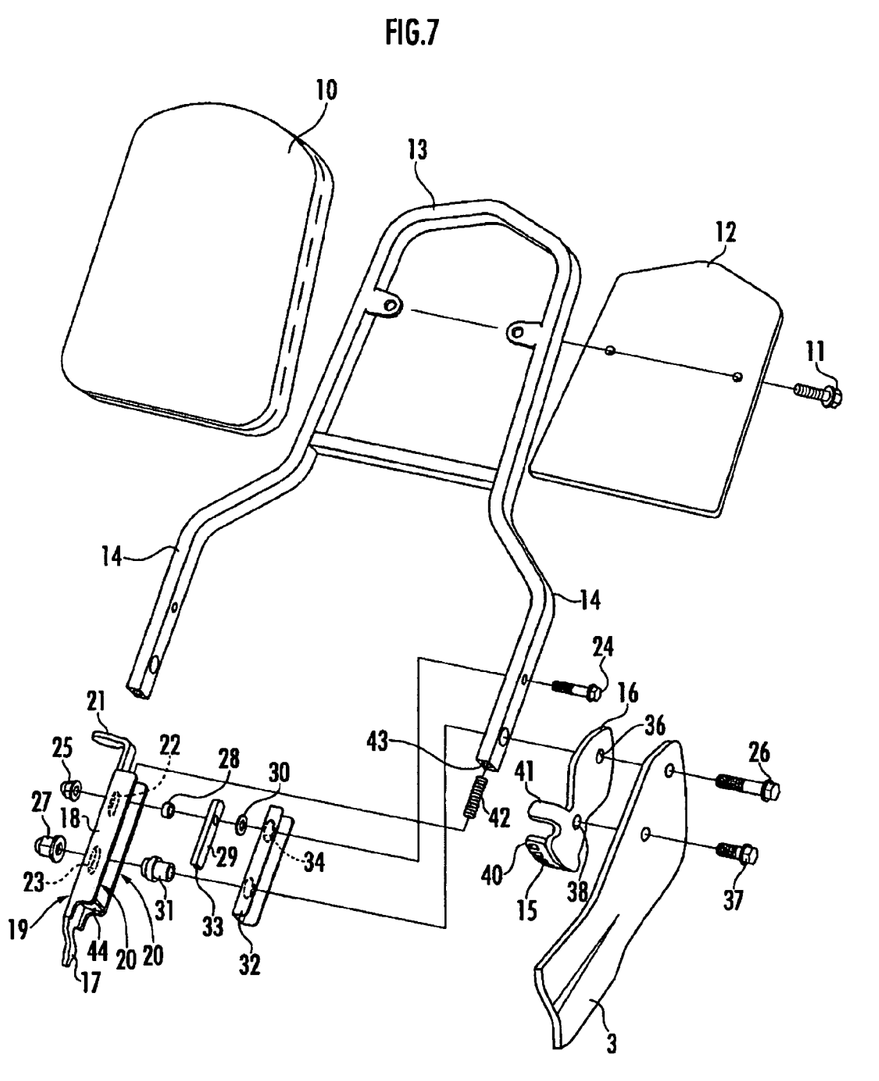
FIG. 7 is an exploded perspective view of the backrest assembly.

As shown in FIGS. 1 and 7, the backrest 4 includes a back cushion 10, a back support member or a cushion support 13 to which the back cushion 10 is attached together with a cover 12 by bolts 11, and a pair of arms 14 (metal arms) extending downward from both sides of the back support member or the cushion support 13. The back support member or the cushion support 13 and the arms 14 are integrally provided in a substantial A-shape, and are made of a chromium-plated iron material shaped like a solid prism.

Figure 2:
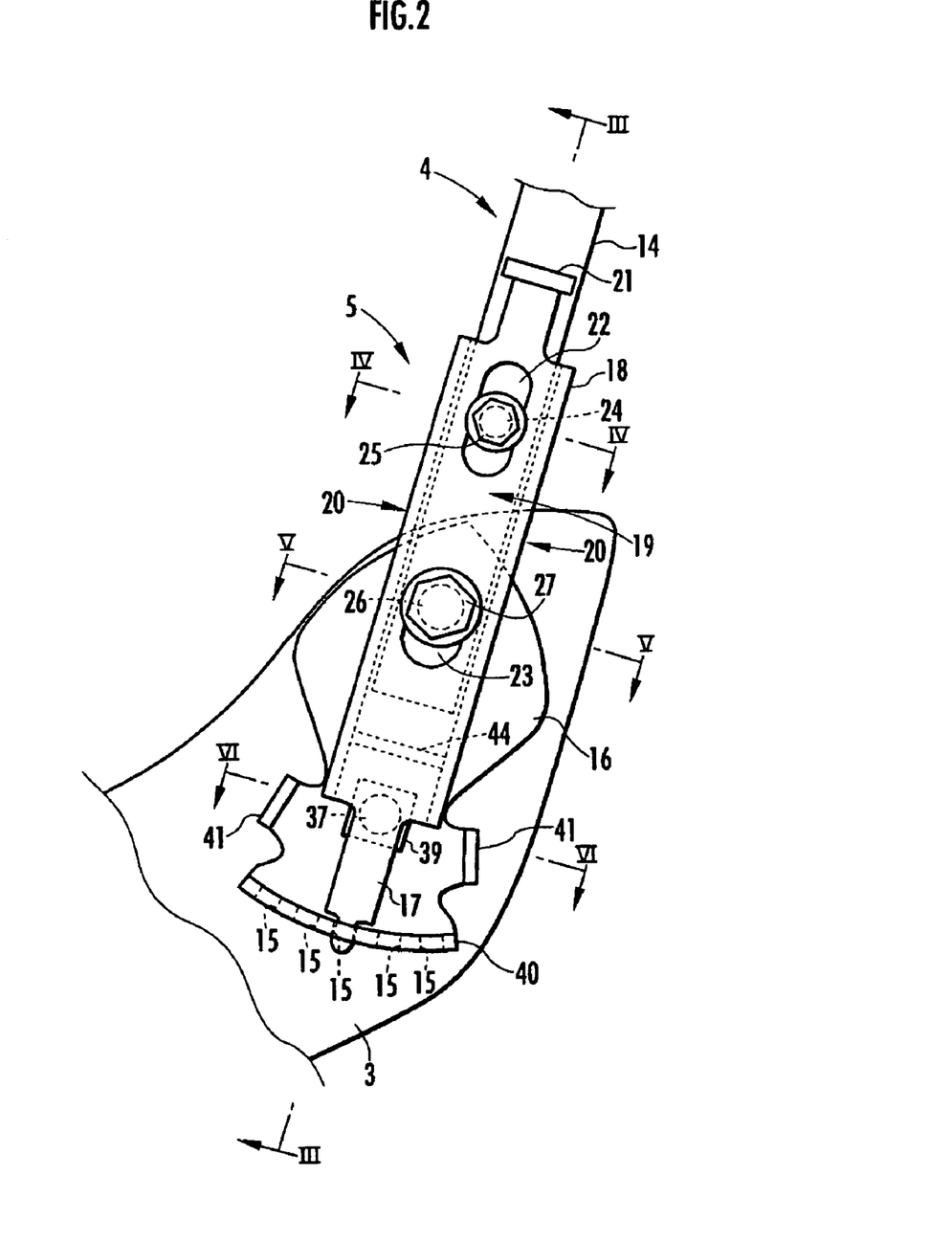
FIG. 2 is a side view of an angle-adjusting unit in the embodiment.
Figure 3:
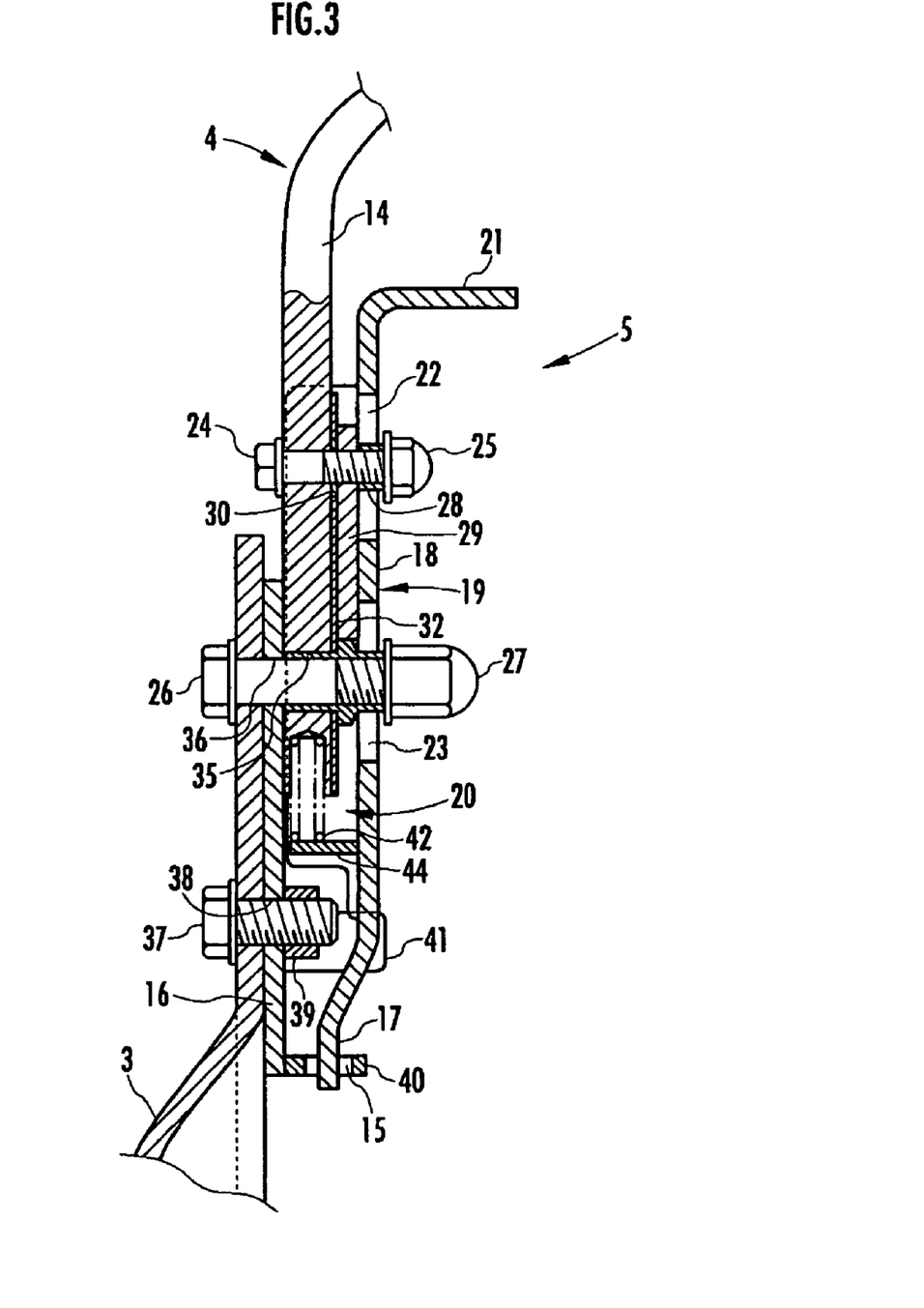
FIG. 3 is a cross-sectional view, taken along line III—III in FIG. 2.

As shown in FIGS. 2 and 3, the angle-adjusting unit 5 includes a base member 16 having a plurality of retaining holes 15 (recesses), and a claw 17 that is selectively retained by the retaining holes 15. In this embodiment, the base member 16 and the claw 17 define the retaining unit of the present invention.

The claw 17 extends downward from a lower end of a sliding member 18 that is slidably held at the bottom of each arm 14. The sliding member 18 can slide along the arm 14, and includes a base portion 19 provided along an inner side face of the arm 14, and a pair of edge portions 20 extending from both sides of the base portion 19 along the front and rear side faces of the arm 14. That is, the sliding member 18 is made of a substantially rectangular chromium-plated iron plate, and both edge portions 20 are formed by bending the iron plate from both sides of the base portion 19. By bending, a sufficient strength is imparted to the sliding member 18, and the boundaries between the base portion 19 and the edge portions 20 are curved, thereby improving the appearance. An operation lever 21 is provided integrally with the upper end of the sliding member 18 so as to extend perpendicularly to the sliding direction of the sliding member 18.

Figure 4:
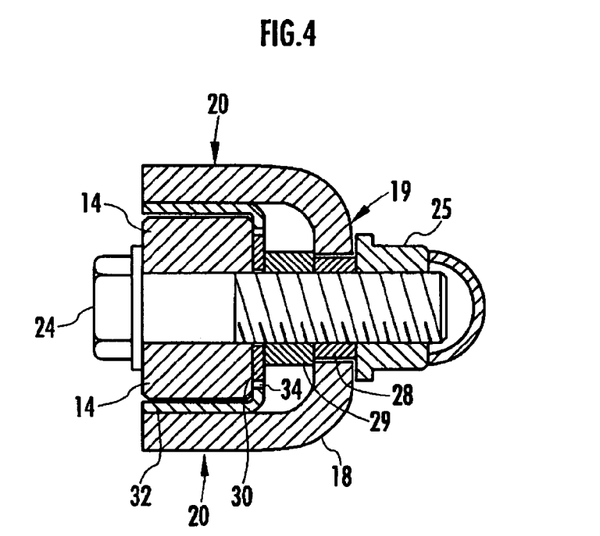
FIG. 4 is a cross-sectional view, taken along line IV—IV in FIG. 2.
Figure 5:
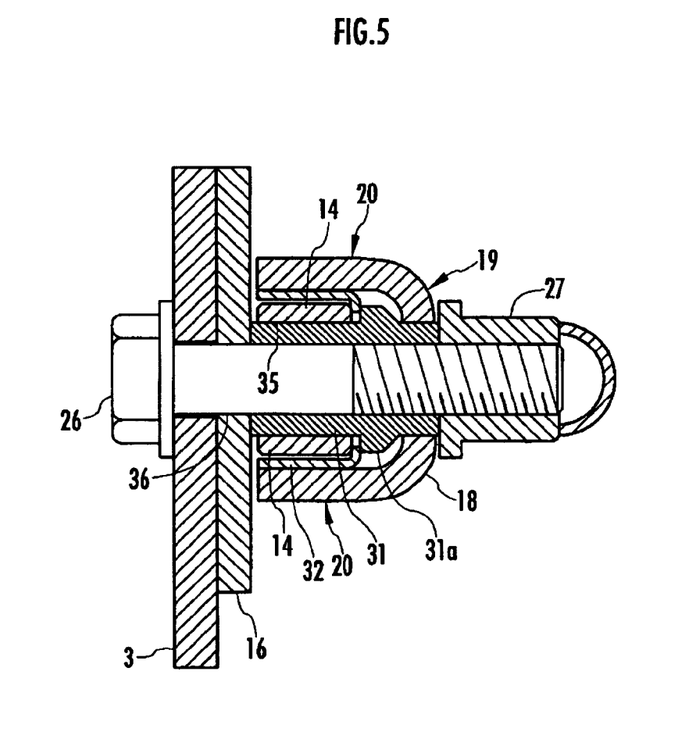
FIG. 5 is a cross-sectional view, taken along line V—V in FIG. 2.

A pair of slots (a first slot 22 and a second slot 23) are provided in the base portion 19 of the sliding member 18, and are vertically arranged in the sliding direction, as shown in FIG. 2. A first bolt 24 extending through the arm 14 is placed in the first slot 22 on the upper side, as shown in FIGS. 3 and 4. By screwing a nut 25 on the leading end of the first bolt 24, the sliding member 18 is slidably held on the arm 14. A second bolt 26 (connecting shaft) extending through the seat stay 3 and the arm 14 is placed in the second slot 23 on the lower side, as shown in FIGS. 3 and 5. By screwing a nut 27 on the leading end of the second bolt 26, the arm 14 is pivotally connected to the seat stay 3.

More specifically, between the sliding member 18 and the arm 14, a collar 28, a spacer 29, and a washer 30 are arranged coaxially with the first slot 22 in that order from the center of the body of the motorcycle, and a flanged collar 31 is provided coaxially with the second slot 23, as shown in FIG. 7. A plate member 32 made of synthetic resin is also provided between the sliding member 18 and the arm 14.

As shown in FIG. 4, the length of the collar 28 that is coaxial with the first slot 22 is slightly larger than the thickness of the base portion 19 of the sliding member 18. Therefore, when the collar 28 is in contact with the spacer 29 and the washer 30, it is placed between an outer peripheral surface of the first bolt 24 and an inner peripheral surface of the first slot 22. Consequently, the sliding member 18 and the arm 14 can be connected by the first bolt 24 without interfering with the sliding motion of the sliding member 18.

As also shown in FIG. 4, the spacer 29 is shaped like a rectangle extending downward, and the motion thereof is restricted by the contact of a recess 33 (FIG. 7) provided at the lower end thereof with the flanged collar 31. The spacer 29 ensures a space between the sliding member 18 and the arm 14 in contact with the synthetic resin plate member 32. The inner corners at the boundaries between the base portion 19 and the edge portions 20 are curved by bending the sliding member 18. Because of this curved shape, if the sliding member 18 were in tight contact with the arm 14, it might be incapable of smoothly sliding as the right-angled corners of the arm 14 touched the curved inner corners of the sliding member 18. However, the inner corners of the sliding member 18 are spaced from the corners of the arm 14 by the spacer 29, so the sliding member 18 slides smoothly.

The washer 30 is disposed in a hole 34 of the synthetic resin plate member 32 between the spacer 29 and the arm 14, as shown in FIG. 4. The thickness of the washer 30 is equal to or slightly larger than that of the plate member 32 so that the sliding motion of the plate member 32 will not be affected with by excessive clamping between the spacer 29 and the arm 14.

The flanged collar 31 is coaxial with the second slot 23 and disposed between an outer peripheral surface of the second bolt 26 and inner peripheral surfaces of both the second slot 23 and a through hole 35 of the arm 14, as shown in FIGS. 3 and 5. Therefore, the sliding member 18, the arm 14, and the seat stay 3 can be coupled by the second bolt 26 without interfering with the sliding motion of the sliding member 18 and the pivotal motion of the arm 14. A flange 31a of the flanged collar 31 is disposed between the plate member 32 and the base portion 19 of the sliding member 18. By fitting the flanged collar 31 in the second slot 23 and then bringing the plate member 32 into contact with the flanged collar 31, the flanged collar 31 is prevented from falling off during assembly.

Figure 6:
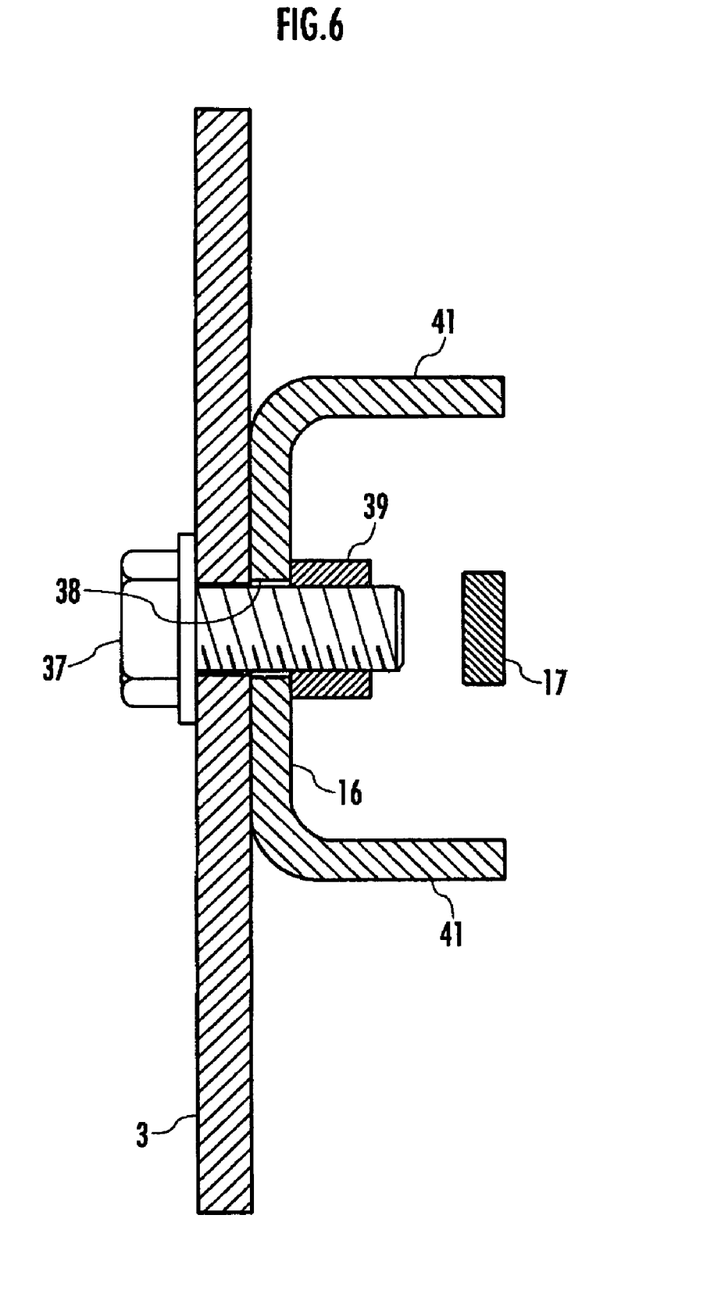
FIG. 6 is a cross-sectional view, taken along line VI—VI in FIG. 2.

The base member 16 is fixed to the seat stay 3, as shown in FIGS. 3, 6, and 7. The base member 16 includes an insertion hole 36 in which the second bolt 26 extending through the seat stay 3 is fitted, and a screw hole 38 in which a third bolt 37 extending through the seat stay 3 is screwed. A nut 39 in which the third bolt 37 is screwed is fixed to the screw hole 38. As shown in FIGS. 2, 6, and 7, an arc-shaped piece 40 having a plurality of retaining holes 15 is fixed inside the lower end of the base member 16. A pair of regulating pieces 41 extend from both edges of the base member 16. The regulating pieces 41 limit the pivotal motion of the arm 14 within a predetermined range in cooperation with the claw 17 extending downward from the sliding member 18. The claw 17 bends below the nut 39 and extends toward the arc-shaped piece 40 so as not to interfere with the nut 39 on the base member 16 and the leading end of the third bolt 37 screwed in the nut 39 and protruding inside the base member 16.

A coil spring 42 serving as the biasing member of the present invention is provided at the lower end of the arm 14, as shown in FIGS. 3 and 7. An upper end of the coil spring 42 is fitted in an insertion hole 43 provided at the lower end of the arm 14, and a lower end thereof is in contact with a contact plate 44 fixed by welding between the edge portions 20 at the lower end of the sliding member 18. The coil spring 42 thereby biases the sliding member 18 in a direction such that the leading end of the claw 17 is meshed with the retaining holes 15 of the base member 16.

The rear carrier 6 can be easily fixed to the rear side of the seat stay 3 by the second bolt 26, which pivotably connects the arm 14 of the backrest 4 to the seat stay 3, and by the third bolt 37, which screws the base member 16 to the seat stay 3, as shown in FIG. 1.

Figure 8:
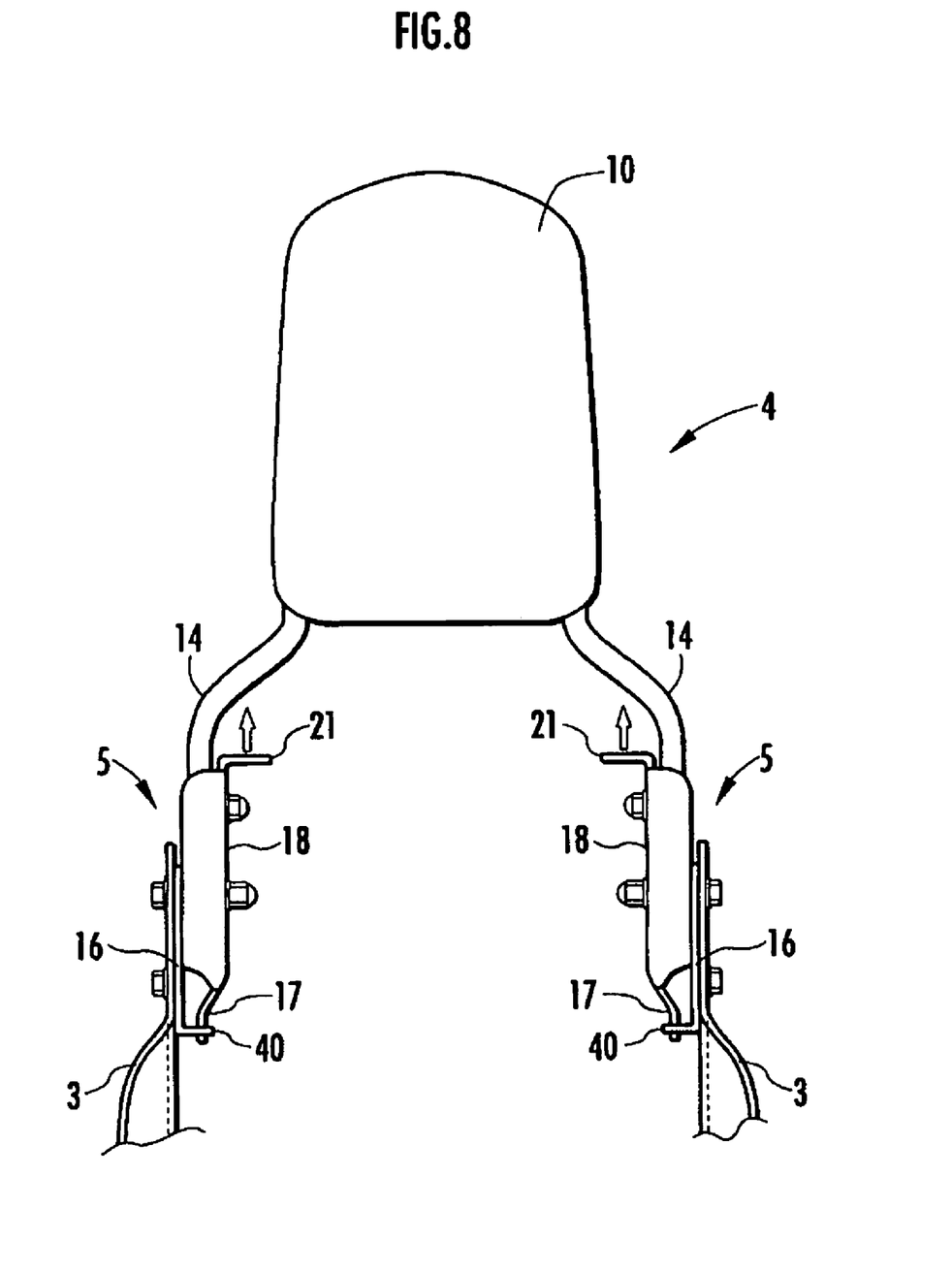
FIG. 8 is an explanatory view schematically showing a lever operation.

A description will be given of a method for adjusting the angle of the backrest 4 with the above-described angle-adjusting unit 5. First, as shown in FIG. 8, the operation levers 21 provided in the right and left sliding members 18 are pulled up by a user's fingers to slide the sliding members 18 upward along the arms 14 against the biasing forces of the coil springs 42. In this case, each of the sliding arms 18 smoothly slides along the arm 14 while being coupled to the arm 14 by the first bolt 24 and the second bolt 26 extending through the slots (first and second slots 22 and 23). Moreover, since the plate member 32 made of synthetic resin is interposed between the arm 14 and the sliding member 18, sliding noise is reduced.

Figure 9A:
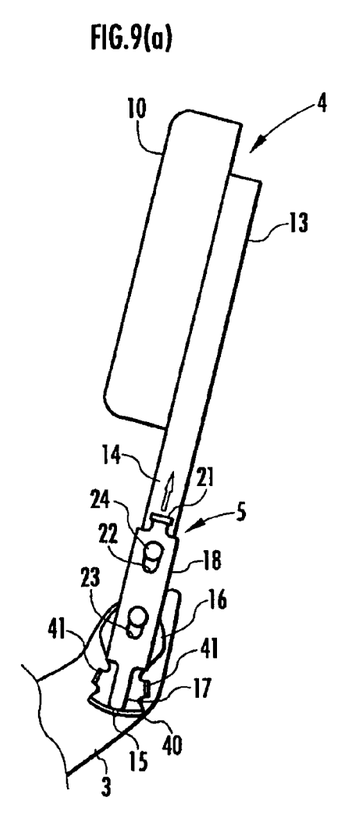
FIGS. 9(a) and 9(b) are explanatory views schematically showing an operation of adjusting the angle of a backrest.
Figure 9B:
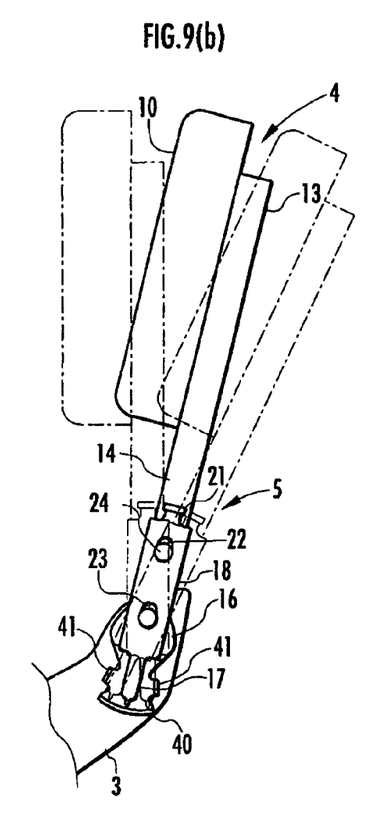

When the sliding member 18 is pulled up, the claw 17 meshed with and retained by a retaining hole 15, as shown in FIG. 9(a), is disengaged from the retaining hole 15, and the arm 14 is permitted to pivot on the second bolt 26, as shown in FIG. 9(b).

Subsequently, the arm 14 is pivoted to a desired angle, until the claw 17 thereby opposes a desired one of the retaining holes 15. By releasing the operation lever 21 in this state, the claw 17 is retained by the retaining hole 15 by the biasing force of the coil spring 42. In this way, the angle-adjusting unit 5 of this embodiment allows the angle of the backrest 4 to be easily and quickly adjusted.

Figure 10:
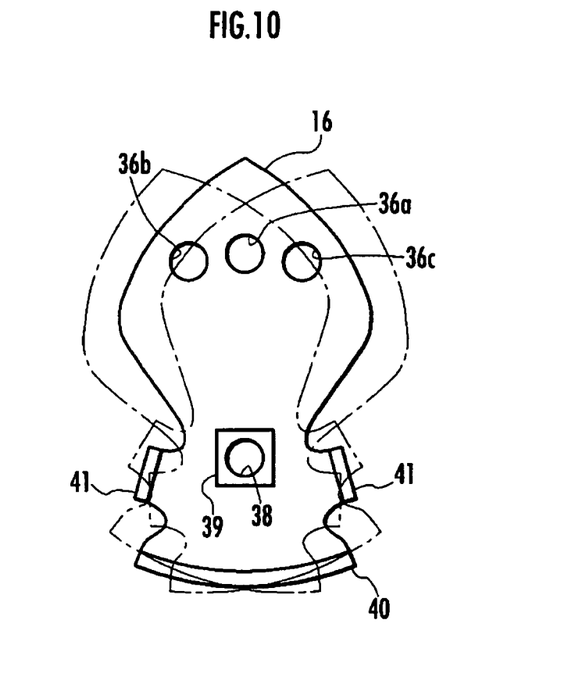
FIG. 10 is an explanatory view of one modification of a base member.

While the second bolt 26 extends through the single insertion hole 36 provided in the base member 16 in this embodiment, as shown in FIGS. 2 and 7, for example, in another embodiment, the second bolt 26 may selectively extend through one of a plurality of (three in the figures) insertion holes 36a, 36b, and 36c, as shown in FIG. 10. Although the basic pivot range of the arm 14 is limited between a pair of regulating pieces 41 extending from both sides of the base member 16, the pivot range can be easily selected merely by mounting the base member 16 so that the second bolt 26 extends through any one of the insertion holes 36a, 36b, and 36c. Furthermore, when different insertion holes 36a, 36b, and 36c are selected between the right and left base members 16, the basic pivot range can be reduced, because the pivotal motion of the arm 14 is limited by the front regulating piece 41 of one of the base members 16 and the rear regulating piece 41 of the other base member 16.

Figure 11:
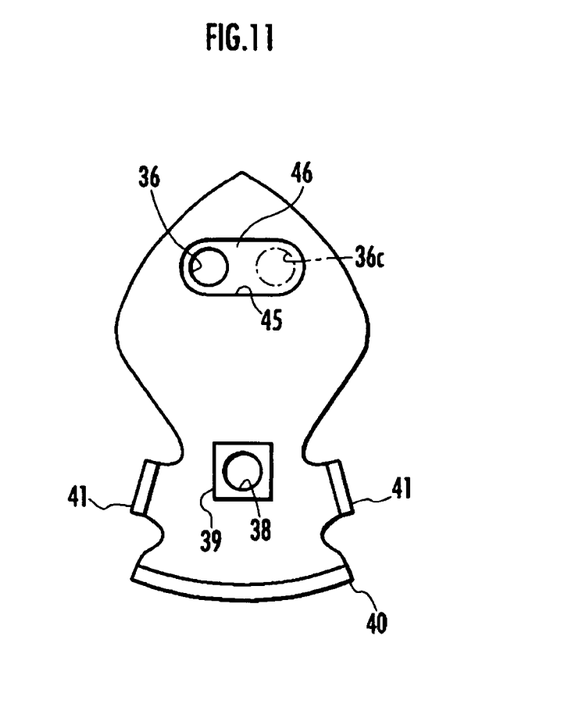
FIG. 11 is an explanatory view of another modification of a base member.

As a modification, an elliptic aperture 45 may be provided in the base member 16, and an offset collar 46 having an insertion hole 36 offset to one side may be detachably fitted in the aperture 45, as shown in FIG. 11. In this case, the basic pivot range of the arm 14 can be easily changed merely by passing the second bolt 26 through the insertion hole 36 while changing the direction of fitting the offset collar 46.

Figure 12:
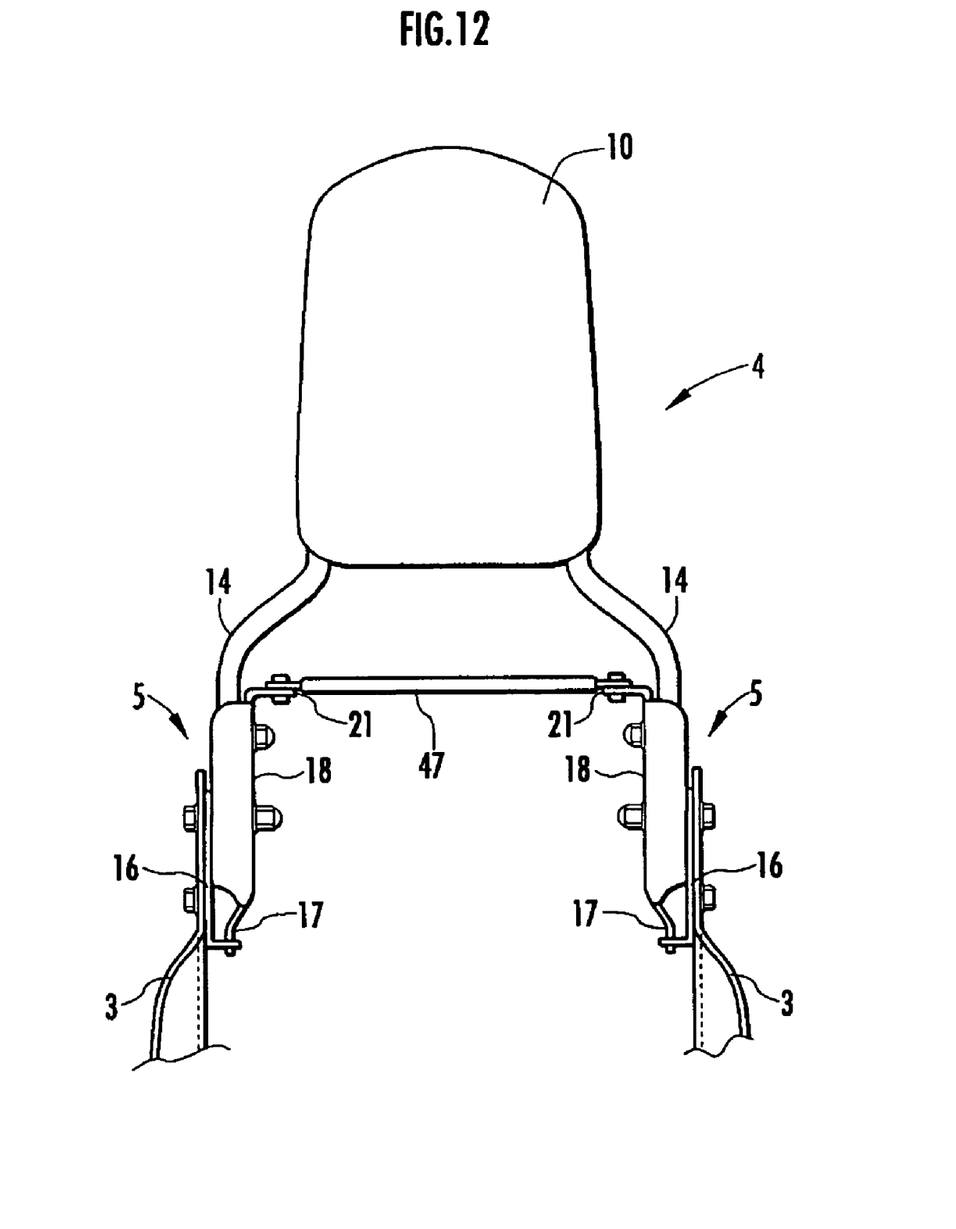
FIG. 12 is an explanatory view schematically showing a state in which right and left levers are coupled to each other.

The present invention is not limited to the above embodiment in which the right and left operation levers 21 are simultaneously pulled up to adjust the angle of the backrest 4, as shown in FIG. 8. For example, the operation levers 21 may be coupled by a crossbar 47, and may be simultaneously moved merely by operating the crossbar 47, as shown in FIG. 12. This allows the angle of the backrest 4 to be adjusted even more easily.

What is claimed is:

1. A backrest assembly for a motorcycle, the backrest assembly comprising:
   a pivotable backrest configured for attachment behind a seat of the motorcycle, the backrest including a back support member and a pair of metal arms extending downward from two sides of the back support member to support the back support member; and
   a pair of angle-adjusting units that adjust the angle of the backrest to a desired angle, each of the angle-adjusting units including a connecting shaft configured to pivotally connect one of the metal arms to an inner side of a seat stay provided along a side of the seat, a retaining unit that selectively and detachably retains a lower end of the corresponding metal arm below the connecting shaft at a plurality of retaining positions, and a biasing member that biases the retaining unit in a retaining direction.

2. The backrest assembly according to claim 1, wherein each retaining unit includes a base member and a claw, wherein said base member has a plurality of recesses and is configured for attachment to one of the corresponding metal arm and the corresponding seat stay, and said claw is configured for attachment to the other of the corresponding metal arm and the corresponding seat stay so as to be selectively and separably retained in the recesses, and one of the claw and the base member is biased in the retaining direction by the biasing member.

3. The backrest assembly according to claim 2, further comprising:
   a pair of sliding members, each of the sliding members being slidable along the corresponding metal arm,
   wherein each of the base members is configured for attachment to the corresponding seat stay with the recesses opposing the lower end of the corresponding metal arm, the claw extending from a lower end of the sliding member toward the recesses of the base member, and the biasing member biasing the claw through the sliding member in a direction such as to retain the claw in the recesses.

4. A motorcycle having the backrest assembly of claim 3.

5. A motorcycle having the backrest assembly of claim 2.

6. A motorcycle having the backrest assembly of claim 1.

7. A backrest assembly for a motorcycle, the backrest assembly comprising:
   a pivotable backrest configured for attachment behind a seat of the motorcycle, the backrest including a back support member and a pair of metal arms extending downward from two sides of the back support member to support the back support member; and
   a pair of means for adjusting the angle of the backrest to a desired angle, each of the means for adjusting including a connecting shaft means for pivotally connecting one of the metal arms to an inner side of a seat stay provided along a side of the seat, a means for selectively and detachably retaining a lower end of the corresponding metal arm below the connecting shaft means at a plurality of retaining positions, and a means for biasing the means for retaining in a retaining direction.

8. The backrest assembly according to claim 7, wherein each means for retaining includes a base member and a claw, wherein said base member has a plurality of recesses and is configured for attachment to one of the corresponding metal arm and the corresponding seat stay, and said claw is configured for attachment to the other of the corresponding metal arm and the corresponding seat stay so as to be selectively and separably retained in the recesses, and one of the claw and the base member is biased in the retaining direction by the means for retaining.

9. A motorcycle having the backrest assembly of claim 8.

10. The backrest assembly according to claim 8, further comprising:

a pair of means for sliding along the corresponding metal arm, wherein each of the base members is configured for attachment to the corresponding seat stay with the recesses opposing the lower end of the corresponding metal arm, the claw extending from a lower end of the corresponding means for sliding and toward the recesses of the base member, and the means for biasing biases the claw through the means for sliding in a direction such as to retain the claw in the recesses.

11. A motorcycle having the backrest assembly of claim 10.

12. A motorcycle having the backrest assembly of claim 7.

* * * * *